No. 892,584. PATENTED JULY 7, 1908.
G. F. EGAN.
MEASURING DEVICE FOR LIQUIDS.
APPLICATION FILED SEPT. 28, 1907.

Witnesses
John F. Cavanagh
E. J. Ogden

Inventor
George F. Egan
By
Howard E. Barlow
Attorney

UNITED STATES PATENT OFFICE.

GEORGE F. EGAN, OF PROVIDENCE, RHODE ISLAND.

MEASURING DEVICE FOR LIQUIDS.

No. 892,584.

Specification of Letters Patent.

Patented July 7, 1908.

Application filed September 28, 1907. Serial No. 394,979.

*To all whom it may concern:*

Be it known that I, GEORGE F. EGAN, a citizen of the United States, residing at the city of Providence, in the county of Providence and State of Rhode Island, have invented certain new and useful Improvements in Measuring Devices for Liquids, of which the following is a specification, reference being had therein to the accompanying drawing.

This invention relates to measuring devices for liquids and has for its object to provide a simple and effective device by which the volume of liquid in any receptacle, such for instance as a gasolene tank, keg or the like, may be quickly and accurately determined.

In the use of automobiles, and other vehicles that depend upon liquid fuel, such as gasolene and the like for their motor power, it is most essential that the quantity in the storage tank may be easily determined so there will be no liability of falling short during a trip in localities where the tank cannot be replenished. In order to readily accomplish this purpose I have provided a convenient and handy instrument which may be inserted through the inlet hole of the storage tank, and by opening the valve in the bottom of the same the gasolene will flow into the glass receiving gage tube, and when the same is withdrawn the exact quantity of liquid in the tank may be determined at a glance.

With these and other objects in view, the invention consists of certain novel features of construction, as will be more fully described and particularly pointed out in the appended claims.

Figure 3:
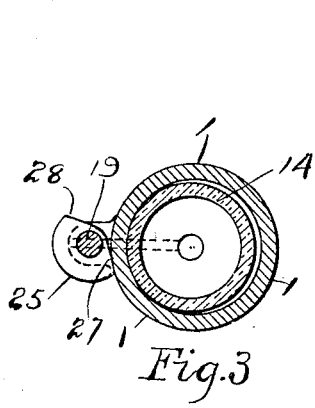
Figure 4:
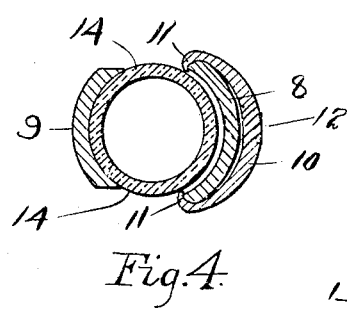
Figure 5:
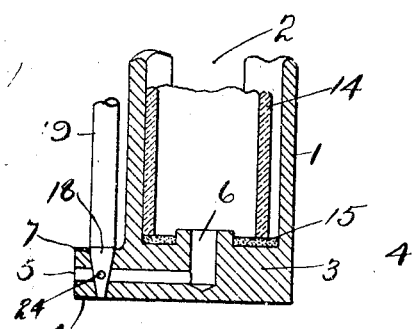
Figure 1:
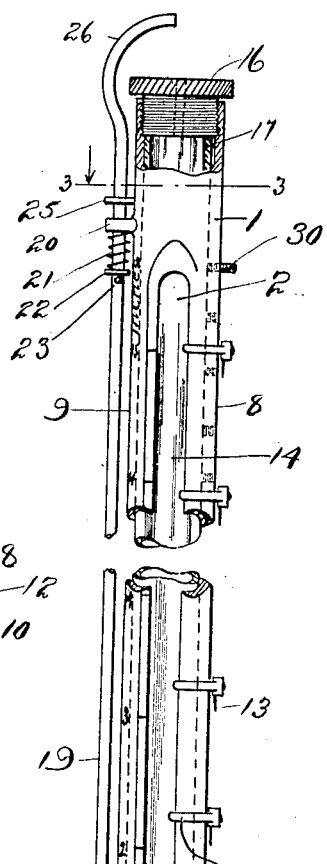
Figure 2:
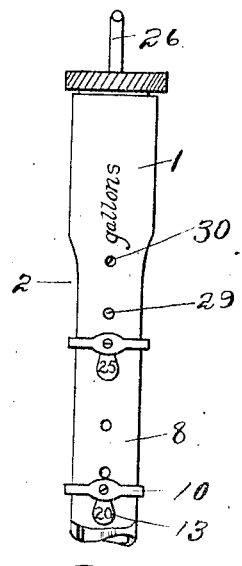
Figure 2:
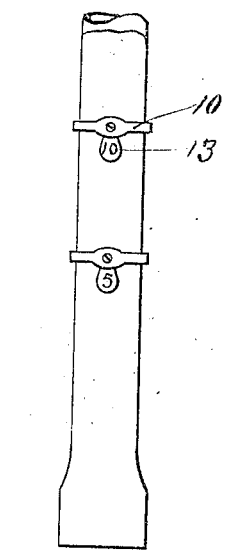

In the accompanying drawings: Figure 1 is a side elevation of the device partly in section. Fig. 2 is a front view of the device showing the adjustable indicating clamps. Fig. 3 is a sectional view on line 3—3 of Fig. 1 looking downward with the indicator removed. Fig. 4 is an end section through one of the adjustable indicating clamps showing the means by which said clamps are connected to the gage casing. Fig. 5 is an enlarged sectional view of the lower end showing the valve for controlling the inlet to the gage.

Referring to the drawings, at 1 is the gage casing which is preferably constructed of a tube of any desired material, the one shown being made of metal, said tube being cut away at each side at 2—2 to provide elongated slots on either side through which to see the contents of the glass tube within, leaving two side strips or members 8 and 9 connecting the top and bottom portions of the case. The lower end of this case is closed at 3 and is also provided with a boss or projection 4 on the side at this lower end. A passageway 5 is drilled longitudinally through the boss 4 to meet a similar passageway 6 which communicates with the interior of said tube. This laterally projecting boss is also provided with a tapering hole 7 formed at right angles to said passageway for the purpose of receiving the plug valve hereinafter described.

Any desired number of small indicating clamps 10—10 are provided with hooked ends 11—11 adapted to engage the edges of the connecting side member 8 and be held in position on said member by the small binding or set screws 12. Each of these indicating clamps are preferably provided with small tags 13 on which may be stamped the number of gallons, cubic feet, or other desired unit of measure. These clamps are adapted to be adjusted either up or down on the side member so as to accommodate themselves to the shape or size of the different tanks which the gage may be called upon to measure. Another feature of the device is that the edge of the opposite side member is graduated into inches by which the contents of the tank may in some cases be computed in inches and a closer or more accurate measurement determined. Within this gage casing is placed a transparent glass tube 14 the lower end of which is adapted to rest upon the packing 15 on the closed end of the case, against which the same is pressed by the screw plug 16 which rests against its upper end 17 to prevent the tube from leaking at its lower end and hold the same firmly in position. In order to control the liquid in entering and leaving the gage a valve 18 is provided which is made preferably in the form of a plug cock, the stem 19 of which is adapted to pass upward through the ear 20 on the side of the gage and have its upper end bent in a form to serve as a handle by which said valve may be operated. This valve is adapted to be continually pressed to its seat by means of the spring 21 which acts from said ear upon a washer 22 supported on the stem 19 by the pin 23. The valve itself is formed by tapering the end of the stem 19 to fit the corresponding hole or seat 7. A port or hole 24 is drilled through said plug so that when the same registers with the inlet 5 the valve is open to admit the liquid therein, but when this hole is turned across this inlet the valve is closed. In order to determine when this valve is opened and closed a stop collar 25 has been provided so that when the handle 26 is turned in position to bring the edge 27 against the side of the gage case 1 the valve is open, and when the handle is turned to bring the edge 28 against the casing the valve is closed. A special feature of this construction is that the valve at the lower end of the gage may be nicely controlled from its upper end through the stem 19 by a slight movement of the handle 26. The side member 8 of this gage frame is also provided with a plurality of small holes 29 in which a screw 30, or other convenient stop, may be secured.
This stop forms a limit or gage against which the upper end of the casing may rest so that the gage may be inserted into the tank the same distance each time and at the same angle.
The operation of my device may be more fully described as follows: The indicating clamps are made adjustable so that they may be moved or adjusted to the measurement of tanks of different sizes and of irregular shape, if desired. One simple way of determining the exact position of these clamps is by first measuring the liquid into the tank with a known measure, for instance, first fill a five gallon can and pour the same into the tank, then insert the gage and allow the liquid to flow into the tube, after which the valve will be closed, the gage withdrawn and the indicating clamp set to the height of the liquid contained therein. Then another five gallons will be poured in and the operation of setting the clamps repeated until all the clamps have been set to the proper height and permanently secured, after which the quantity may be accurately determined at any time by simply inserting the gage.
In some cases it is found that the gage cannot sit upright but is obliged to be passed into the tank on an angle, and in order to be sure that the gage is inserted the same distance each time and at the proper angle an adjustable stop pin 30 is provided against which the gage will bring up and by the use of my adjustable indicating clamps the gage may be set to as accurately indicate the amount in the tank as though it were used in an upright position.
The device is very neat in its appearance and effective in its operation, and by its use the quantity in any receptacle may be readily determined.
Having thus described my invention, what I claim as new and desire to secure by Letters Patent, is:

1. A measuring device for liquids comprising a casing, a transparent tube in said casing, a rotatable liquid controlling valve at the lower end of said tube, an elongated stem on said valve by which the same may be controlled at the upper end of said tube, means acting on said stem for pressing said valve to its seat, a plurality of indicating clamps adapted to be adjusted longitudinally on said casing, and a binding screw on each clamp whereby the same may be set to indicate the amount of liquid in the receptacle measured.

2. A measuring device for liquids comprising a casing provided with elongated openings on its sides, a glass tube retained in said casing, a rotatable liquid controlling valve at the lower end of the casing, an elongated stem on the exterior of said casing by which the said valve is controlled, a spring acting through said stem to press said valve to its seat, a stop for limiting the opening and closing movement of said valve, and adjustable means for indicating the amount of liquid in the receptacle measured.

3. A measuring device for liquids comprising a casing provided with elongated openings on its sides, a glass tube retained in said casing, a liquid controlling valve at the lower end of the casing, an elongated stem on the valve by which the same may be controlled at the upper end of said casing, means acting on said stem for pressing said valve to its seat, a stop for limiting the opening and closing of said valve, a plurality of adjustable indicating clamps adapted to engage the edges of the casing to slide thereon, and screws for holding the same in position on said casing.

In testimony whereof I affix my signature in presence of two witnesses.

GEORGE F. EGAN

Witnesses:
 FRANK L. HINCKLEY,
 ARTHUR M. ALLEN.